United States Patent [19]

Borrelli et al.

[11] 4,240,836
[45] Dec. 23, 1980

[54] COLORED PHOTOCHROMIC GLASSES AND METHOD

[75] Inventors: Nicholas F. Borrelli, Elmira; Brent M. Wedding, Corning, both of N.Y.

[73] Assignee: Corning Glass Works, Corning, N.Y.

[21] Appl. No.: 95,435

[22] Filed: Nov. 19, 1979

[51] Int. Cl.³ .......................... C03C 3/08; C03C 3/20; C03C 3/26
[52] U.S. Cl. .................... 106/47 Q; 65/32; 65/30 R; 106/53; 106/54; 106/DIG. 6; 428/428; 428/913
[58] Field of Search .................. 106/47 Q, 52, 53, 54, 106/DIG. 6; 65/32, 30

[56] References Cited

U.S. PATENT DOCUMENTS

| | | | |
|---|---|---|---|
| 3,892,582 | 7/1975 | Simms | 65/32 X |
| 4,018,965 | 4/1977 | Kerko et al. | 428/913 |
| 4,118,214 | 10/1978 | Wedding | 65/32 X |
| 4,125,405 | 11/1978 | Araujo et al. | 106/54 |
| 4,190,451 | 2/1980 | Hares et al. | 106/DIG. 6 |

*Primary Examiner*—Helen M. McCarthy
*Attorney, Agent, or Firm*—Kees van der Sterre; Clinton S. Janes, Jr.

[57] ABSTRACT

Surface-colored photochromic glass articles produced by reduction heat treatments at 450° C. and below which exhibit induced absorption peaks at longer wavelengths than prior art glasses, and surface colors such as orange, red, purple and blue, are described.

12 Claims, 3 Drawing Figures

COLORED PHOTOCHROMIC GLASSES AND METHOD

BACKGROUND OF THE INVENTION

The present invention is in the field of photochromic glasses and particularly relates to surface-colored photochromic glass articles produced by a reduction heat treatment.

Silver halide-containing photochromic glasses are well known in the art, having been first described by Armistead et al. in U.S. Pat. No. 3,208,860, and thereafter finding commercial use principally in the manufacture of photochromic ophthalmic lenses. Such lenses darken upon exposure to actinic radiation, e.g. ultraviolet light, and fade in the absence thereof.

Second-generation silver halide-containing photochromic glasses exhibiting improved darkening and fading characteristics have also been recently introduced. One family of such glasses has been described by G. B. Hares et al. in a commonly assigned, copending application, Ser. No. 14,981, filed Feb. 28, 1979 U.S. Pat. No. 4,190,451.

Colored photochromic glasses, meaning photochromic glasses exhibiting non-neutral coloration in transmitted light in the undarkened state, are also known. These may be produced by the addition of light-absorbing colorants into the base glass, or by processing the glass during or subsequent to manufacture. U.S. Pat. Nos. 3,892,582 and 3,920,463 to Simms describe a postmanufacturing coloring treatment wherein pink, yellow or brown photochromic glasses are produced by firing silver halide-containing photochromic glass articles in a reducing atmosphere. U.S. Pat. No. 4,125,405 to Araujo et al. describes red silver halide-containing glasses, produced under reducing melting conditions, which are slightly photochromic.

The reduction-melted glasses reported by Araujo et al. are insufficiently photochromic for commercial use in photochromic products. Attempts to enhance the photochromic performance thereof by heat treatment typically destroy the red color of the glass. The yellow photochromic glasses described in the Simms patents are of commercial interest, but the pink and brown glasses are not, the brown color being too dark for most applications and the pink color being too light.

The yellow observed upon the heat treatment of photochromic glasses under reducing conditions in the manner disclosed by Simms is attributed to an absorption band caused by the precipitation of metallic silver in the glass during heat treatment. In silver-containing glasses free of other precipitated phases, the silver absorption band is manifested as an absorption peak centered at about 390 nm in the violet region of the spectrum. In the reduction-fired photochromic glasses reported in the aforementioned Simms patents, which contain precipitated silver halide in addition to the matrix glass, absorption peaks are reported in the blue region of the spectrum between about 430–460 nm.

The hue and intensity of the induced color in prior art glasses probably depended upon the position and intensity of the treatment-induced absorption peak. The deepest yellow colors were caused by strong absorption peaks at 430 to 460 nm, while the light pink color is now thought to have been caused by the same fundamental absorption peak as it first appeared in weak form at about 500 nm following a mild heat treatment.

While reduction firing treatments such as used in the prior art constituted a simple and convenient method for imparting surface coloration to photochromic glasses, they offered only a very limited range of color selection. Attempts to intensify the colors provided, for example by using more severe heat treatments, appeared merely to shift the fundamental absorption peak towards the violet, resulting in a more intensely yellow glass.

SUMMARY OF THE INVENTION

In accordance with the present invention, surface-colored photochromic glass articles which can exhibit, for example, orange, red, purple, or blue surface coloration in the undarkened state are provided by the reduction heat treatment of silver halide-containing photochromic glasses under appropriate thermal conditions. These results are obtained using a somewhat lower range of heat treatment temperature than was utilized for the purpose in the prior art, in order to minimize photochromic phase (silver halide) melting during the reduction treatment. Additional factors affecting results are the composition and thermal history of the photochromic glass starting material used in the coloring process.

The wide range of surface coloration observed in photochromic glasses produced according to the invention is attributed to the development during heat treatment of strong absorption bands in the glass surface, centered at wavelengths above 460 nm and frequently in the range of 510–580 nm, which shift the hue of the glass out of the yellow and into the orange, red, violet, or blue regions of the spectrum. This represents a significant departure from the surface-colored photochromic glasses disclosed in the prior art, which exhibited strong absorption only at 430–460 nm and relatively weak absorption at the wavelengths required to produce non-yellow glasses.

Viewed in terms of spectral light transmittance characteristics, the surface-colored photochromic glass articles of the prior art, at least in the ophthalmic lens form commonly employed, tended to exhibit induced absorption peaks located to the left of the line CB in FIGS. 1–3 of the drawings, as most clearly shown in FIG. 2. The present invention provides surface-colored photochromic glass articles having induced peaks positioned to the right of the line CB, as illustrated in FIGS. 1 and 3.

In one aspect, then, the invention comprises a surface-colored photochromic glass article produced by a process which comprises heat treating a silver halide-containing photochromic glass article under reducing conditions at a temperature not exceeding about 450° C., that treatment being continued for a time sufficient to develop specific light absorption characteristics in the glass article. Those characteristics are such that, following the reduction heat treatment, the glass article exhibits, in at least one cross-sectional dimension in the undarkened state, a spectral transmittance curve comprising at least one treatment-induced absorption peak having a peak location and intensity such that the peak falls within the spectral transmittance region to the right of the line CB in FIG. 1 of the drawings, as hereinafter more fully described.

In another aspect, the invention comprises a method for providing induced surface coloration in a silver halide-containing photochromic glass article. That method comprises the step of heat-treating the article under reducing conditions at temperatures not exceeding about 450° C. for a time sufficient to develop at least one treatment-induced absorption peak having the characteristics above described.

Absorption characteristics such as noted in the present glasses were first induced in second generation photochromic glasses of the type described in the aforementioned Hares et al. application, and that application is expressly incorporated herein by reference for a description of one family of photochromic glasses which can be usefully treated in accordance with the invention. However the novel absorption effects are not limited to such glasses, having been observed in other types of photochromic glasses exposed to reduction heat in the manner hereinafter described.

It is believed that the unusual coloration effects observed in photochromic glasses subjected to treatments according to the invention are caused by the chemical reduction of silver in contact with silver halide microcrystals in a region very near the surface of the glass, with the observed color being determined by the geometric form and arrangement of metallic silver on these microcrystals. This would be consistent with the experimentally observed fact that, using a given reduction heat treatment, a particular photochromic glass can exhibit any of a number of different absorption peaks depending upon the process originally used to develop the microcrystalline photochromic silver halide phase in that glass.

DESCRIPTION OF THE DRAWING

The invention may be further understood by reference to the drawing, wherein.

DETAILED DESCRIPTION

For the purpose of the present description, a treatment-induced absorption peak is one induced by the surface reduction of a photochromic glass as herein described. Such a peak is one which is not present in the parent photochromic glass from which the surface-colored product is made. A surface-colored photochromic glass article is therefore one wherein the surface color differs from the bulk color of the article, if any, a condition which can readily be determined by comparing the spectral transmittance characteristics of the article before and after the removal of a small amount of surface glass therefrom.

Also for the purposes of the present description, the peak location or position of an absorption peak is defined by its wavelength and intensity, with the wavelength being taken to be that wavelength at which a minimum in light transmittance through the undarkened glass article is observed to result from the peak. In some cases, however, the absorption bands giving rise to such peaks may be sufficiently close in wavelength that one absorption peak is manifested only as a shoulder on another absorption peak. The position of the former peak in that circumstance can be resolved in accordance with conventional spectral analysis techniques.

Figure 2:
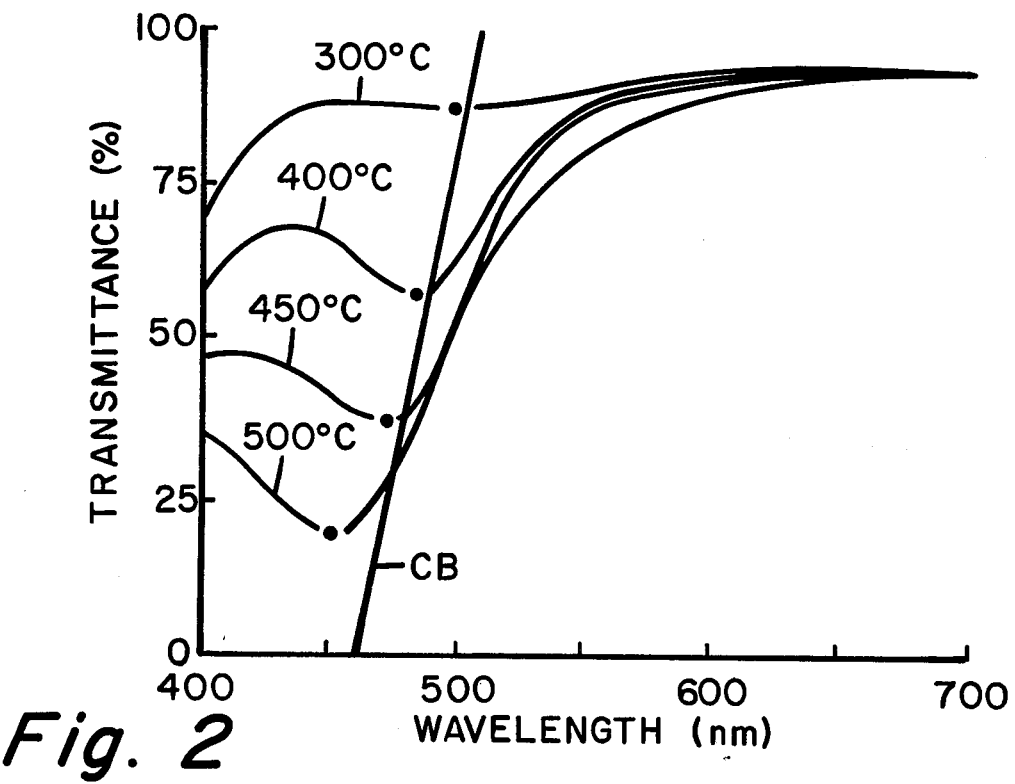
FIG. 2 plots undarkened transmittance vs. light wave-length for a surface-colored photochromic glass article subjected to a number of prior art reduction firing treatments, and FIG. 3 plots undarkened transmittance vs. light wave-length for a photochromic glass article in both untreated and various treated states.

For the purpose of exemplifying the absorption characteristics of some prior art glasses, FIG. 2 of the drawing sets forth spectral transmittance curves for a series of undarkened surface-colored photochromic glass ophthalmic lens blanks provided in accordance with prior practice. These lens blanks were composed of Corning Code 8097 photochromic glass, commercially available as PHOTOGRAY ® photochromic glass from Corning Glass Works, Corning, New York, and were produced by the heat treatment of uncolored photochromic glass lens blanks in an atmosphere of 100% $H_2$ for 10 minutes at various heating temperatures reported in the drawing. The approximate composition of this glass, in weight percent, is about 55.9% $SiO_2$, 9.0% $Al_2O_3$, 16.2% $B_2O_3$, 2.65% $Li_2O$, 1.85% $Na_2O$, 5.05% PbO, 6.7% BaO, 2.3% $ZrO_2$, 0.16% Ag, 0.29% Cl, 0.72% Br, 0.036% CuO and 0.2% F.

As is evident from a study of FIG. 2, the surface-colored glasses produced by such treatments have absorption characteristics which typically range from very slight absorption at about 510 nm upon mild heat treatment to increasingly intense absorption at lower wavelengths upon more severe heat treatment. The slightly absorbing glass produced by treatment of 300° C. appears pink in color, while the more intensely absorbing glasses exhibit yellow colors.

Insofar as described in the prior art, products of these types never exhibited significant induced absorption at wavelengths above 510 nm and never exhibited strong induced absorption peaks in the 460–510 nm range. Hence, the absorption peaks exhibited by these glasses, the positions of which are marked by points at the transmittance minima associated with the peaks, appeared to be limited to that region to the left of the line marked CB in FIG. 2, hereinafter sometimes referred to as a color barrier, and the color of the glass products was limited accordingly.

Figure 1:
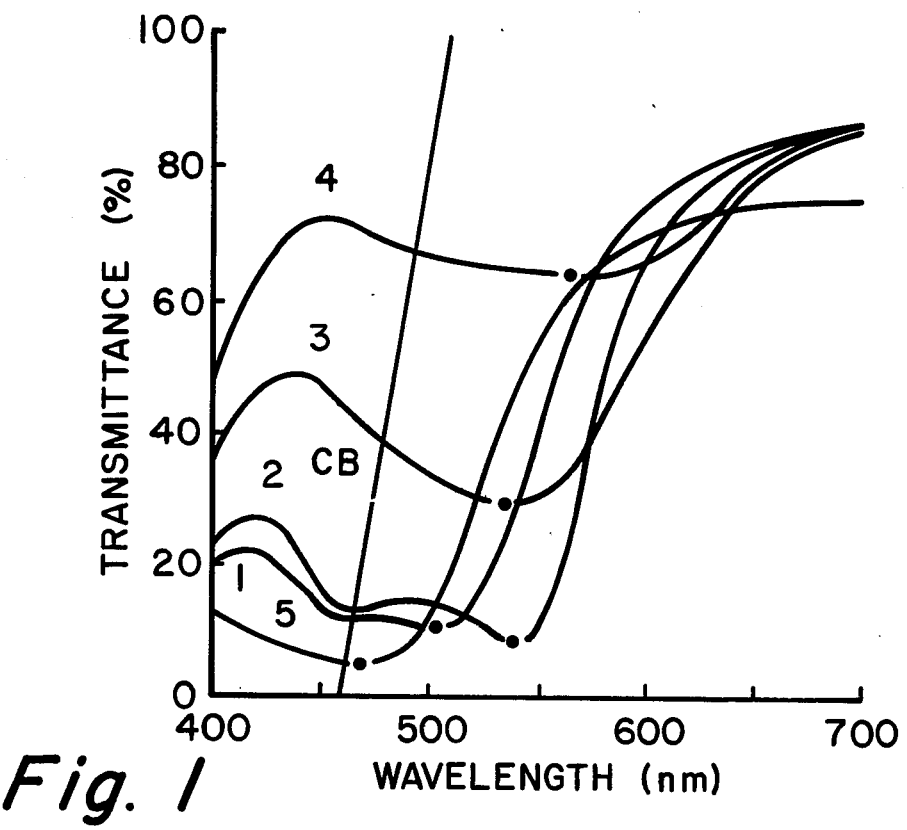
FIG. 1 plots undarkened transmittance vs. light wave-length for a number of surface-colored photochromic glass articles provided according to the invention.
Figure 3:
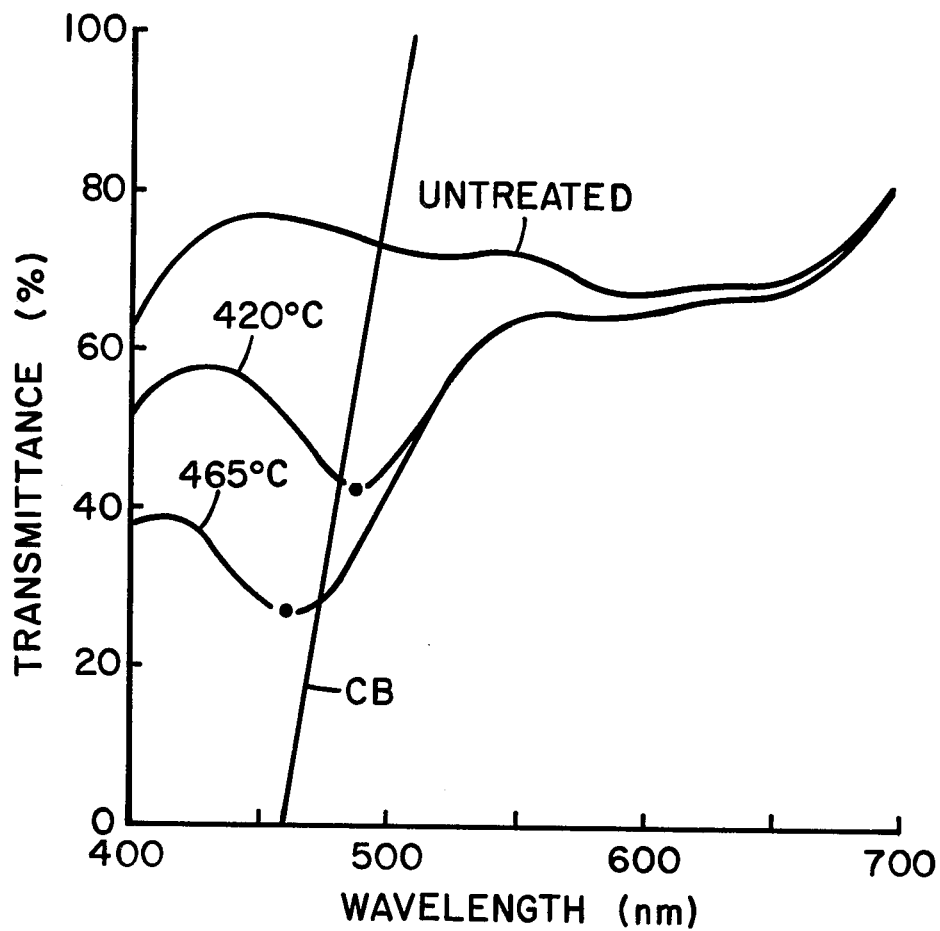

In direct contrast to this behavior, glass articles provided in accordance with the present invention can exhibit strong induced absorption bands to the right of the position of the color barrier and into the green and yellow regions of the spectrum. FIG. 1 of the drawing contains undarkened spectral transmittance curves for a number of such surface-colored glass articles, and illustrates the variety of different induced absorption characteristics exhibited thereby. The color barrier CB in FIG. 1, as in FIGS. 2 and 3, is a straight line connecting the 0% transmittance point at 460 nm and the 100% transmittance point at 510 nm on a linear scale transmittance-wavelength diagram. The absorption characteristics exhibited by the inventive articles can range from a strong absorption peak to the right of the line CB in the blue region of the spectrum, providing an orange coloration in transmitted light (Curves 1 and 5 of FIG. 1), to a broad absorption peak centered in the yellow region of the spectrum which imparts a blue color to the glass (Curve 4 of FIG. 1). The development of absorption peaks between these two extremes in otherwise colorless photochromic glasses can yield surface-colored glasses exhibiting red and purple coloration in transmitted light, or mixtures of orange, red, purple and/or blue colors.

As previously indicated, the absorption characteristics provided in accordance with the invention are strongly dependent upon the temperature at whigh the glass is maintained during the reduction heat treatment.

Specifically, it appears to be very difficult to provide orange, red, purple and/or blue coloration utilizing heat treatment temperatures substantially in excess of about 450° C. To cite a specific example, if the glass of Curve 1 in FIG. 1 is heat treated in a reducing atmosphere at temperatures approaching and exceeding 450° C., the relatively strong absorption peak at about 510 nm is shifted to an absorption near 450 nm and the glass becomes lighter and more yellow in color. For this reason, heat treatment at temperatures in the range of about 200°–450° C. are preferred for use according to the invention.

It has also been determined that the surface coloration exhibited by the heat-treated glass is strongly dependent on the thermal history of the photochromic starting material. In the extreme case where the starting material is the glass of Curve 1 of FIG. 1 which has been simply annealed rather than heat-treated at a photochromic phase development temperature, the reduction-heat-treated product is yellow for all reduction heat treatments in the 300°–450° C. range.

Base glass composition appears to have an equally important effect on the variety of surface coloration which can be obtained. While the glass of Curve 1 of FIG. 1 is orange following a reduction heat treatment at 400° C. for one hour, Corning Code 8097 photochromic glass such as was used to provide surface-colored photochromic glass articles in accordance with prior art teachings is yellow in color after an identical reduction heat treatment.

Photochromic glasses which are preferred for use in the production of surface-colored photochromic glass articles in accordance with the invention are those set forth in the aforementioned Hares et al. disclosure. Such glasses consist essentially, in weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges between about 0.55–0.85 and the weight ratio Ag:(Cl+Br) ranges between about 0.65–0.95. As also noted in the Hares et al. disclosure, such glasses may additionally contain, as optional constituents, up to about 10% total of other selected oxides or elements for known purposes, including up to about 6% $ZrO_2$, up to about 3% $TiO_2$, up to about 0.5% PbO, up to about 7% BaO, up to about 4% CaO, up to about 3% MgO, up to about 6% $Nb_2O_5$, up to about 4% $La_2O_3$, and up to about 2% F.

In some instances it may be desirable to modify the apparent color of surface-colored photochromic glass articles provided in accordance with the invention, for example, by adding bulk glass colorants to the photochromic glass during melting. In the case of the aforementioned Hares et al. glasses, transition metal oxide and rare earth metal oxide colorants are compatible with the disclosed compositions and have been found not to interfere with the practice of the present invention. Thus up to about 1% total of transition metal oxides and/or 5% total of rare earth metal oxide colorants may be present among the other selected oxides in surface-colored photochromic glass articles provided in accordance with the invention, in order to modify the apparent color thereof in transmitted light, if desired.

Of course, other photochromic glasses have been found suitable for use in the invention in varying degrees, depending upon the extent to which they exhibit induced absorption peaks at relatively long wavelengths. Another composition field wherein examples of such behavior have been observed is that described by Kerko et al. In U.S. Pat. No. 4,018,965, which includes photochromic glasses consisting essentially, in weight percent, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% total of $Li_2O+Na_2O+K_2O$, a weight ratio of $Li_2O$ content to $Na_2O+K_2O$ content not exceeding about 2:3, 0.7–3.0% PbO, 0.1–1.0% Ag, 0.15–1.0% Cl, 0–3.0% Br, 0–2.5% F, 0.008–0.12% CuO, 0–1% total of transition metal oxide colorants, and 0–5% total of rare earth metal oxide colorants. As noted in the Kerko et al. patent, such glasses are particularly suitable for the manufacture of sheet glass for photochromic sunglass lenses or the like.

Reducing gases which may be used to induce surface coloration in photochromic glasses according to the invention include any of the reducing materials employed for the same or similar purposes in the prior art. Specific examples are hydrogen ($H_2$), forming gas (e.g. 95% $N_2$+5% $H_2$ by volume), carbon monoxide and cracked ammonia. From the commercial standpoint, $H_2$–$N_2$ mixtures such as provided by cracked ammonia will normally be preferred.

The invention may be further understood by reference to the following illustrative examples more fully demonstrating the production of surface-colored photochromic glass articles in accordance therewith.

EXAMPLE 1

A composition for a photochromic glass consisting essentially, in parts by weight, of about 56.46 parts $SiO_2$, 6.19 parts $Al_2O_3$, 18.15 parts $B_2O_3$, 1.81 parts $Li_2O$, 4.08 parts $Na_2O$, 5.72 parts $K_2O$, 4.99 parts $ZrO_2$, 2.07 parts $TiO_2$, 0.006 parts CuO, 0.207 parts Ag, 0.166 parts Cl and 0.137 parts Br is melted in a continuous melting unit, pressed into ophthalmic lens blanks, and annealed using a peak annealing temperature of 470° C. for an annealing interval of 10 minutes, followed by cooling at furnace rate. Several of these annealed ophthalmic lens blanks are converted to photochromic lens blanks by heat treatment at 660° C. for 30 minutes, while several other of the annealed blanks are converted to photochromic blanks by heat treatment at 550° C. for 65 hours. Small glass samples are then cut from the photochromic ophthalmic lens blanks and polished to 2 millimeter thickness.

A sample of the above-described photochromic glass heat-treated at 550° C. is placed in a furnace operating at 400° C. and containing a flowing atmosphere of 100% $H_2$. The glass sample is maintained in the furnace for one hour and then removed from the furnace and examined.

The surface-colored sample resulting from this treatment appears bright orange in transmitted light and exhibits an undarkened spectral transmittance curve substantially conforming to that reported as Curve 1 in FIG. 1 of the drawing. The characteristics of that curve include strong absorption peaks centered at 460 and 510 nm, with a transmittance of about 11% at 510 nm in the undarkened state.

EXAMPLE 2

One of the glass samples receiving a 660° C. photochromic development heat treatment as described in Example 1 above is exposed to the reduction heat treatment described in that example, consisting of treatment in a flowing 100% H₂ atmosphere at 400° C. for 1 hour. Following the reduction heat treatment, the sample is found to exhibit a red coloration in transmitted light, and to have a spectral transmittance curve substantially conforming to that designated Curve 2 in FIG. 1 of the drawing. That curve is characterized by strong absorption peaks centered at about 460 and 540 nm, with the transmittance of the sample at 540 nm being about 9% in the undarkened state.

EXAMPLE 3

Two photochromic glass samples which have received a 550° C. photochromic development heat treatment as described in Example 1 are selected for reduction heat treatment. One of the samples, referred to as Sample 3, is exposed to a reduction heat treatment at 300° C. for 1 hour in flowing 100% H₂. The other sample, referred to as Sample 4, is subjected to a reduction heat treatment at 200° C. for 16 hours in flowing 100% H₂.

When removed from the heat treatment furnace and examined in transmitted light, Sample 3 exhibits a purple color of medium intensity while Sample 4 exhibits a light blue coloration. The spectral transmittance curves of these samples conform, respectively, to Curves 3 and 4 in FIG. 1 of the drawing. Sample 3 exhibits an absorption peak centered at about 535 nm in the yellow-green portion of the visible spectrum, having an undarkened transmittance at that wavelength of 29%. Sample 4 exhibits a broad absorption peak centered at about 565 nm in the yellow portion of the visible spectrum, exhibiting an undarkened transmittance at that wavelength of about 63.5%.

In the commercial production of photochromic ophthalmic lenses, the customary procedure is to grind, polish and edge selected pairs of photochromic lens blanks to particular prescriptions, and then to strengthen the finished lenses using thermal or chemical tempering techniques. Both such strengthening techniques involve heating the lenses to elevated temperatures.

Because the colors imparted to silver-containing glasses by reduction heat treatments are surface colors, they are normally applied only to glass surfaces which have already been ground and polished, or which will not require later grinding and polishing. Color application could be accomplished either before or after the aforementioned lens strengthening procedures, but will typically be accomplished beforehand, with the strengthening process being the last high-temperature process experienced by the glass.

The usual effect of heating a surface-colored photochromic glass article to a temperature above that at which it was colored, as may occur during ion-exchange strengthening or thermal tempering, is to shift the induced absorption bands toward the violet region of the spectrum and thereby to shift the color of the glass towards the yellow. In cases where it is desired to avoid such shifts, it may be possible to chemically or otherwise strengthen the photochromic glass prior to the color-inducing reduction heat treatment, and to thereafter reduction-heat-treat the glass without significantly affecting its strength. This practice is illustrated by the following Example.

EXAMPLE 4

A pair of photochromic glass ophthalmic lens blanks, commercially available from Corning Glass Works as Corning Code 8111 lens blanks and having a composition substantially conforming to the composition of the samples described in Examples 1–3 above, is selected for treatment. This lens blank pair is ground and polished to a prescription and edged for framing, and is then chemically strengthened by immersion in a molten salt ion exchange strengthening bath containing KNO₃ and NaNO₃ at a temperature of 400° C. for 16 hours.

Following ion exchange strengthening, the lenses are plunged into a tube furnace operating at a temperature of 430° C., maintained in that furnace under an atmosphere of 100% H₂ for 15 minutes, and then removed from the furnace and examined. The treated lenses are found to exhibit a vermilion coloration in transmitted light, due to a strong, medium-width absorption peak centered at about 510 nm in the green region of the spectrum. The undarkened transmittance of the lenses at 510 nm is about 44%.

When framed to provide a pair of photochromic sunglasses, these lenses provide particularly good performance out-of-doors under green background conditions, because of their relatively low transmittance with respect to green light combined with their significantly higher transmittance of blue, yellow and red light. These transmittance characteristics improve object-background contrast for many objects viewed against a green background.

The use of the invention to provide a surface-colored photochromic glass article from a photochromic glass article containing a bulk glass colorant in the form of a dissolved oxide is shown by the following example.

EXAMPLE 5

A pair of photochromic glass ophthalmic lens blanks having a composition substantially conforming to that of the photochromic glass of Example 1 above, but additionally containing about 0.09 parts NiO and 0.01 parts CoO by weight as dissolved oxide glass colorants, is provided for treatment. These lens blanks are commercially available from Corning Glass Works as Corning Code 8115 lens blanks, and are light brown in color.

The blanks are ground and polished to a specific ophthalmic prescription. The resulting lens pair is then plunged into a furnace operating at a temperature of 420° C. and containing an atmosphere of 100% H₂, maintained therein for an interval of 15 minutes to impart surface coloration thereto, and then removed.

The colored lenses thus provided, exhibiting a color attributable to a combination of bulk and induced surface coloration, are subjected to an ion-exchange strengthening treatment substantially conforming to that treatment described in Example 4 above, comprising a 16-hour exposure to a molten salt bath at a temperature of 400° C., and thereafter removed, washed and examined. The resulting strengthened lenses are copper (red-brown) in color, exhibiting a rather broad induced absorption band centered at about 485 nm, and having a transmittance at that wavelength of about 25% in 2 mm thickness. They exhibit good photochromic darkening and fading response.

The use of Corning Code 8115 glass lenses having a composition such as above described constitutes a particularly preferred embodiment of the invention, as does the use of Corning Code 8114 glass, a light gray glass of the same base composition but containing 0.017 parts NiO and 0.020 parts CoO by weight in place of the NiO and CoO in the former glass. Nevertheless, other photochromic glasses can alternatively be used to provide surface colored photochromic glass articles according to the invention, as detailed in the following examples.

EXAMPLE 6

A composition for a photochromic glass which consists essentially, in weight percent, of about 59.83% $SiO_2$, 15.01% $B_2O_3$, 9.42% $Al_2O_3$, 1.84% $Li_2O$, 3.5% $Na_2O$, 5.8% $K_2O$, 4.6% CaO, 0.5% Ag, 0.5% Cl and 0.06% CuO is melted in a small continuous melting unit and formed into a glass article. The article thus provided is annealed at a peak annealing temperature of about 470° C. for an annealing interval of 10 minutes and then cooled at furnace rate.

Small glass samples are then cut from this article and polished to approximately 2 mm thickness. One of the samples is further heat treated at a temperature of 575° C. for about 60 minutes to provide a photochromic glass sample therefrom.

This photochromic sample is positioned in a furnace operating at a temperature of 400° C. and containing an atmosphere of 100% $H_2$ for a treating interval of one hour. It is then removed from the furnace and examined.

The color of this sample in transmitted light is dark orange. The spectral transmittance curve of the sample corresponds substantially to that shown as Curve 5 in FIG. 1 of the drawing. That curve exhibits a strong absorption peak centered at about 470 nm in the blue region of the spectrum and a transmittance at that wavelength, in a sample thickness of about 2 mm in the undarkened state, of about 6%.

EXAMPLE 7

A thin photochromic sunglass lens, formed of drawn sheet glass and having a composition, in parts by weight, of about 58.6 parts $SiO_2$, 17.5 parts $B_2O_3$, 11.5 parts $Al_2O_3$, 7.7 parts $Na_2O$, 2.0 parts $Li_2O$, 1.5 parts $K_2O$, 2.2 parts PbO, 0.3 parts Ag, 0.37 parts Cl, 0.13 parts Br, 0.022 parts F, 0.025 parts CuO, 0.041 parts NiO and 0.029 parts CoO, is provided for treatment. This lens is light gray in color in the undarkened state, having a thickness of about 1.5 mm. and an undarkened spectral transmittance curve substantially conforming to the curve labeled 'Untreated' in FIG. 3 of the drawing.

Surface coloration is imparted to this lens by plunging it into a furnace operating at 420° C. and containing an atmosphere of 100% hydrogen for 15 minutes. Following this treatment the lens is removed from the furnace and examined.

The treated lens is gray-brown in color in transmitted light and has an undarkened spectral transmittance curve substantially conforming to that of the curve labeled "420° C." in FIG. 3 of the drawing. Hence the glass exhibits a treatment-induced absorption peak at a peak location of about 490 nm which reduces the transmittance of the undarkened glass at that wavelength to about 42%.

The importance of treatment temperature on the induced absorption effects observed in reduction-heat-treated photochromic glasses may be demonstrated by treating a gray sunglass lens of a composition identical to that just described at 465° C. in flowing hydrogen for 15 minutes. The product of this treatment is yellow-gray in color and has a transmittance curve substantially conforming to the curve labeled "465° C." in FIG. 3 of the drawing. That curve indicates that the induced absorption peak is shifted to about 460 nm at a point to the left of the line CB in FIG. 3 by this treatment, resulting in the strong yellow color component observed in this glass.

Of course it is evident that the foregoing examples are merely representative of surface-colored photochromic glass articles which could be provided in accordance with the invention, It will thus be apparent that numerous variations and modifications of the specific procedures hereinabove described may thus be resorted to in carrying out the invention within the scope of the appended claims.

We claim:

1. A colored silver halide-containing photochromic glass article exhibiting a surface coloration produced by the heat treatment of the photochromic glass article under flowing gaseous reducing conditions at a heat treatment temperature not exceeding about 450° C., said colored photochromic glass article exhibiting, in at least one cross-sectional dimension in the undarkened state, a spectral transmittance curve comprising at least one treatment-induced absorption peak having a peak location to the right of the line CB of FIG. 1 of the drawing.

2. A colored glass article in accordance with claim 1 which has a composition consisting essentially, in weight percent, of about 0–2.5% $Li_2O$, 0–9% $Na_2O$, 0–17% $K_2O$, 0–6% $Cs_2O$, 8–20% total of $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.2% Br, and 0.1–0.25% Cl, and includes, as optional constituents, up to about 10% total of other oxides or elements selected in amounts not exceeding the indicated proportions from the group consisting of up to 6% $ZrO_2$, up to 3% $TiO_2$, up to 0.5% PbO, up to 7% BaO, up to 4% CaO, up to 3% MgO, up to 6% $Nb_2O_5$, up to 4% $La_2O_3$, up to 2% F, up to 1% of transition metal oxide colorants, and up to 5% of rare earth metal oxide colorants, wherein the molar ratio of alkali metal oxides:$B_2O_3$ ranges between about 0.55–0.85 and the weight ratio Ag:(Cl+Br) ranges between about 0.65–0.95.

3. A colored glass article in accordance with claim 2 which contains about 56.46 parts $SiO_2$, 6.19 parts $Al_2O_3$, 18.15 parts $B_2O_3$, 1.81 parts $Li_2O$, 4.08 parts $Na_2O$, 5.72 parts $K_2O$, 4.99 parts $ZrO_2$, 2.07 parts $TiO_2$, 0.006 parts CuO, 0.207 parts Ag, 0.116 parts Cl and 0.137 parts Br by weight.

4. A colored glass article in accordance with claim 3 which contains about 0.09 parts NiO and 0.01 parts CoO by weight.

5. A colored glass article in accordance with claim 3 which contains about 0.017 parts NiO and 0.020 parts CoO by weight.

6. A colored glass article in accordance with claim 1 which has a composition consisting essentially, in weight percent, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% total of $Li_2O+Na_2O+K_2O$, a weight ratio of $Li_2O$ content to $Na_2O+K_2O$ content not exceeding about 2:3, 0.7–3.0% PbO, 0.1–1.0% Ag, 0.15–1.0% Cl, 0–3.0% Br, 0–2.5% F, 0.008–0.12% CuO, 0–1% total of transition metal oxide colorants, and 0–5% total of rare earth metal oxide colorants.

7. A colored glass article in accordance with claim 6 which contains about 58.6 parts $SiO_2$, 17.5 parts $B_2O_3$, 11.5 $Al_2O_3$, 7.7 parts $Na_2O$, 2.0 parts $Li_2O$, 1.5 parts $K_2O$, 2.2 parts PbO, 0.3 parts Ag, 0.37 parts Cl, 0.13 parts Br, 0.022 parts F and 0.025 parts CuO by weight.

8. A method for producing a surface-colored photochromic glass article which comprises the step of heat-treating a silver halide-containing photochromic glass article under flowing gaseous reducing conditions at a temperature not exceeding about 450° C. for a time at least sufficient to modify the surface light absorption characteristics of the article such that the article exhibits, in at least one cross-sectional dimension in the undarkened state, a spectral transmittance curve comprising at least one treatment-induced absorption peak having a peak location to the right of the line CB in FIG. 1 of the drawing.

9. A method in accordance with claim 8 wherein the silver halide-containing photochromic glass article is a finished ophthalmic lens which has been strengthened by a thermal or chemical tempering technique.

10. A method in accordance with claim 8 which comprises the further step, following the heat treatment of the article under reducing conditions, of strengthening the article by a thermal or chemical tempering technique.

11. A method in accordance with claim 8 wherein the silver halide-containing glass article has a composition consisting essentially, in weight percent, about 0–2.5% $Li_2O$, 0–9% $Na_2O$, 0–17% $K_2O$, 0–6% $Cs_2O$, 8–20% total of $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.2% Br, and 0.1–0.25% Cl, and includes, as optional constituents, up to about 10% total of other oxides or elements selected in amounts not exceeding the indicated proportions from the group consisting of up to 6% $ZrO_2$, up to 3% $TiO_2$, up to 0.5% PbO, up to 7% BaO, up to 4% CaO, up to 3% MgO, up to 6% $Nb_2O_5$, up to 4% $La_2O_3$, up to 2% F, up to 1% of transition metal oxide colorants, and up to 5% of rare earth metal oxide colorants, wherein the molar ratio of alkali metal oxides:$B_2O_3$ ranges between about 0.55–0.85 and the weight ratio Ag:(Cl+Br) ranges between about 0.65–0.95.

12. A method in accordance with claim 8 wherein the silver halide-containing glass article has a composition consisting essentially, in weight percent, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% total of $Li_2O+Na_2O+K_2O$, a weight ratio of $Li_2O$ content to $Na_2O+K_2O$ content not exceeding about 1:3, 0.7–3.0% PbO, 0.1–1.0% Ag, 0.15–1.0% Cl, 0–3.0% Br, 0–2.5% F, 0.008–0.12% CuO, 0–1% total of transition metal oxide colorants, and 0–5% total of rare earth metal oxide colorants.

* * * * *